United States Patent
Miyata

(12) 
(10) Patent No.: US 7,104,568 B2
(45) Date of Patent: Sep. 12, 2006

(54) AIRBAG DEVICE AND MOTORCYCLE WITH THE AIRBAG DEVICE

(75) Inventor: Yasuhito Miyata, Shiga (JP)

(73) Assignee: Takata Corporation, (JP)

( * ) Notice: Subject to any disclaimer, the term of this patent is extended or adjusted under 35 U.S.C. 154(b) by 182 days.

(21) Appl. No.: 10/813,523

(22) Filed: Mar. 30, 2004

(65) Prior Publication Data
US 2004/0251664 A1    Dec. 16, 2004

(30) Foreign Application Priority Data
Jun. 11, 2003    (JP)    ............... 2003-166979

(51) Int. Cl.
*B60R 21/16*    (2006.01)

(52) U.S. Cl. .................................................. 280/730.1

(58) Field of Classification Search ............. 280/730.1, 280/728.1
See application file for complete search history.

(56) References Cited

U.S. PATENT DOCUMENTS 6,846,009 B1 *    1/2005    Kuroe et al. ............. 280/730.1

FOREIGN PATENT DOCUMENTS

| JP | 2002-137777 | | 5/2002 |
|---|---|---|---|
| JP | 2003327182 | A * | 11/2003 |
| JP | 2005153613 | A * | 6/2005 |

* cited by examiner

*Primary Examiner*—Faye M. Fleming
(74) *Attorney, Agent, or Firm*—Fitch, Even Tabin & Flannery

(57) ABSTRACT

An airbag device includes an airbag and a retainer and is mounted to a motor-bicycle which is a motorcycle. The airbag is deployed and inflated in a rider protection area which is situated in front of a rider when the motor-bicycle collides at a location which is situated in front of the motor-bicycle. The retainer can accommodate the airbag. A second structural portion of the airbag is disposed outside the retainer and astride a central portion in a forward/backward direction, and is mounted to the front portion of a panel by mounting members.

22 Claims, 7 Drawing Sheets

AIRBAG DEVICE AND MOTORCYCLE WITH THE AIRBAG DEVICE

FIELD OF THE INVENTION

The present invention relates to a technology of constructing an airbag device mounted to a motorcycle.

BACKGROUND OF THE INVENTION

Hitherto, various technologies of protecting a rider by an airbag device mounted to a motorcycle have been known. For example, a technology used in a motor-bicycle for restraining a rider by deploying and inflating an airbag, accommodated in a case mounted to a vehicle frame, by inflation gas when the motor-bicycle collides at a location which is situated in front of the motor-bicycle is known, refer to, for example, Japanese Unexamined Patent Application Publication No. 2002-137777. In this technology, it is possible to provide a wide area of protection using the airbag. However, there is a strong demand for a technology which is more effective in reliably restraining a rider by an airbag when an airbag device is mounted to a vehicle body having an open structure in all directions like the body of a motorcycle.

SUMMARY OF THE INVENTION

Accordingly, it is an object of the present invention to provide a technology of constructing an airbag which thoroughly protects a rider on a motorcycle in an accident, and technologies related thereto.

To this end, the inventions disclosed in the claims are provided, and may be applied to a structure of an airbag device mounted to various types of motorcycles. In the specification, the term "motorcycle" is used to widely include vehicles in which a rider sits astride a seat. Therefore, for example, a motor-bicycle of a type having a fuel tank disposed in front of a rider's seat and a motor-bicycle of a scooter-type having a space between a rider's seat and a handlebar supporting head tube are defined as motorcycles. In addition, the term "motorcycle" is used to widely include, in addition to motor-bicycles, vehicles having three or more wheels and having a seat that a rider sits astride (such as a three-wheeled motorcycle used to, for example, deliver pizzas to homes, and a three-wheeled or a four-wheeled buggy motorcycle for traveling bad roads completely), and vehicles, such as snowmobiles, which move using a sled or a crawler and which have a seat that a rider sits astride.

In one aspect of the invention, an airbag device for being mounted to a motorcycle comprises an airbag and an accommodating member.

When the motorcycle collides at a location which is situated in front of the motorcycle, inflation gas is supplied into the airbag used in the present invention. The accommodating member has a structure which can accommodate the airbag. In a typical structure of the airbag device, the airbag and mechanism for inflating the airbag, such as an inflator, are accommodated in a retainer, serving as the accommodating member, and the inflation gas is supplied into the airbag by operating the inflator. By this, the airbag is deployed and inflated while protruding in a direction of a rider protection area which is situated in front of the rider.

A portion of or the entire airbag in the present invention is disposed outside the accommodating member. This mode of disposing the airbag may be achieved by deploying (drawing out) a portion of or the entire airbag from the accommodating member in the airbag device having the entire airbag accommodated in and mounted to the accommodating member, or by previously mounting the airbag device so that a portion of or the entire airbag is disposed outside the accommodating member.

According to such a structure of the present invention, it is possible to increase directivity regarding protrusion of the airbag by disposing a portion of or the entire airbag device outside the accommodating member, so that this structure is effective in controlling a protruding direction of the airbag. In other words, although it is necessary to think about, for example, in what form the airbag is to be folded so that it protrudes in a proper protruding direction in a related structure in which the entire airbag is accommodated in the accommodating member, the structure of the invention makes it is possible to stably and reliably protrude the airbag in the direction of the rider protection area by disposing a portion of or the entire airbag disposed outside the accommodating member at a location that opposes the rider protection area.

By disposing a portion of or the entire airbag outside the accommodating member as in the present invention, it is possible to reduce the amount of time required to complete deployment and inflation of the entire airbag, so that it is possible to enhance restrainability with respect to a rider. In addition, such a structure makes it possible to reduce the size of the accommodating member. In other words, although an accommodating member that is disposed at, in particular, the body of a motorcycle having an open structure is generally large because there is a demand for reliably restraining the rider by a larger airbag, it possible to reduce the size of the accommodating member while enhancing restrainability with respect to the rider by the airbag by disposing a portion of or the entire airbag outside the accommodating member as in the present invention. By this, it is possible to improve the appearance of the motorcycle having the airbag device mounted thereto.

In particular, in the present invention, the portion of or the entire airbag outside the accommodating member is disposed astride a handlebar section at the body of the motorcycle in a forward/backward direction. Typical disposing modes include a mode in which the airbag is disposed from the rear side to the front side of the body of the motorcycle astride the top portion of the handlebar section extending towards the left and right of the body of the motorcycle, and a mode in which the airbag is disposed from the front side to the rear side of the body of the motorcycle astride the top portion of the handlebar section. The term "handlebar section" in the present invention is used to include, not to mention the handlebars themselves, various types of members, such as a bracket, mounted to the handlebars, and a structure which is a combination of such various types of members and the handlebars.

According to such a structure, since the handlebar section is disposed opposite the rider protection area with the airbag being disposed between the rider protection area and the handlebar section, it is possible to reduce the frequency with which the airbag that is being deployed and inflated gets caught by the handlebar section. In addition, the mode of disposing the airbag astride the handlebar section is effective in reliably engaging the airbag that is being deployed and inflated with the handlebar section, so that a load that the rider exerts upon the airbag is reliably received by the handlebar section. Therefore, it is possible to thoroughly protect the rider in an accident.

It is desirable that the portion of or the entire airbag outside the accommodating member be mounted to a member at the body of the motorcycle, that is, at a location thereof that allows protrusion of the portion of or the entire airbag outside the accommodating member in the direction of the rider protection area. In a typical mounting example, the portion of or the entire airbag outside the accommodating member is mounted to a member at the body of the motorcycle opposing (facing) the rider protection area. Such a mounting mode makes it possible for the airbag to be smoothly deployed and inflated without the airbag getting caught by, for example, a protruding portion of the member at the body of the motorcycle. Therefore, it is possible to thoroughly protect the rider in an accident.

The phrase "a member at the body of the motorcycle" is mainly used to widely include various members that are either directly or indirectly mounted to the body of the motorcycle. Typical examples include handlebars and a panel, which are mounted to the body of the motorcycle. For example, a portion of or the entire airbag may be mounted directly to the handlebars or may be mounted indirectly to the handlebars through, for example, a bracket. In addition, "a member at the body of the motorcycle" includes a member that is defined as such only when the airbag device is mounted to the body of the motorcycle, such as a structural portion of the airbag device that becomes a portion of the body of the motorcycle when the airbag device is mounted to the body of the motorcycle.

The term "mountable" in the present invention includes any mode in which the airbag is consequentially mounted to a member at the body of the motorcycle, so that this term is used to widely include a mode in which the portion of or the entire airbag outside the accommodating member is mounted to a member at the body of the motorcycle before, when, or after mounting the airbag device to the body of the motorcycle. Therefore, when the airbag is mounted to a member at the body of the motorcycle is not in question here.

A motorcycle generally has a structure in which the handlebar section opposes (faces) the rider protection area which is situated in front of a rider. Such a structure makes it possible to stably and reliably protrude the airbag in the direction of the rider protection area by disposing the portion of or the entire airbag outside the accommodating member at the handlebar section opposing the rider protection area. In addition, such a structure of the present invention enhances mountability of the airbag device because the mounting location of the portion of or the entire airbag device outside the accommodating member is easily set.

In particular, by mounting the portion of or the entire airbag outside the accommodating member to the handlebar section by mounting mechanism, such as types of rivets, bolts, or clips, it is possible to prevent the airbag from being displaced by the mounting mechanism when the airbag that is completely deployed and inflated restrains the rider. In addition, by causing the handlebar section that is rigid to operate as a pressure section of the airbag that is completely deployed and inflated, it is possible for the handlebar section to reliably receive a load that the rider exerts upon the airbag. In general, the handlebar section of the motorcycle may be disposed at a location where the airbag that is being deployed and inflated easily gets caught by the handlebar section. The structure in which the portion of or the entire airbag outside the accommodating member is mounted to the handlebar section itself makes it possible to reduce the frequency with which the airbag that is being deployed and inflated gets caught by the handlebar section. In general, the handlebar section is long. By mounting the portion of or the entire airbag outside the accommodating member over a wide range in a longitudinal direction of the long handlebar section, it is possible to increase directivity regarding protrusion of the airbag, so that this structure is effective in controlling a protruding direction of the airbag.

In one form, the portion of or the entire airbag outside the accommodating member is disposed astride the central portion of the handlebar section. The central portion is disposed near the body of the motorcycle, and is attached to the body of the motorcycle. Operating portions operated by a rider protrude upwardly leftwards and upwardly rightwards from the central portion of the handlebar section, respectively. Such a structure is an improved structure because a recess space that is formed by the central portion and operating portions of the handlebar section is used as a deployment and inflation area of the airbag.

In another form, the portion of or the entire airbag disposed outside the accommodating member is covered with a cover. As the cover, it is desirable to use, for example, a cloth or resinous cover that covers the airbag. Such a cover is effective in, for example, maintaining a folded state of the airbag or protecting the airbag from outside the airbag. During the deployment and inflation of the airbag, the cover is torn or pushed away in order to allow the deployment and inflation of the airbag. By virtue of such a structure, the cover will not hinder the deployment and inflation of the airbag.

The invention may be in combination with a motorcycle having the airbag device of any one of the above-described forms mounted thereto. The portion of or the entire airbag that is disposed outside the accommodating member is disposed astride the handlebar section at the body of the motorcycle in the forward/backward direction, and is mounted to the member at the body of the motorcycle. By this, it possible for the airbag to be smoothly deployed and inflated without the airbag getting caught by, for example, a protruding portion of the member at the body of the motorcycle. Therefore, it is possible to provide a motorcycle which can thoroughly protect a rider in an accident.

DETAILED DESCRIPTION OF THE PREFERRED EMBODIMENTS

Figure 1:
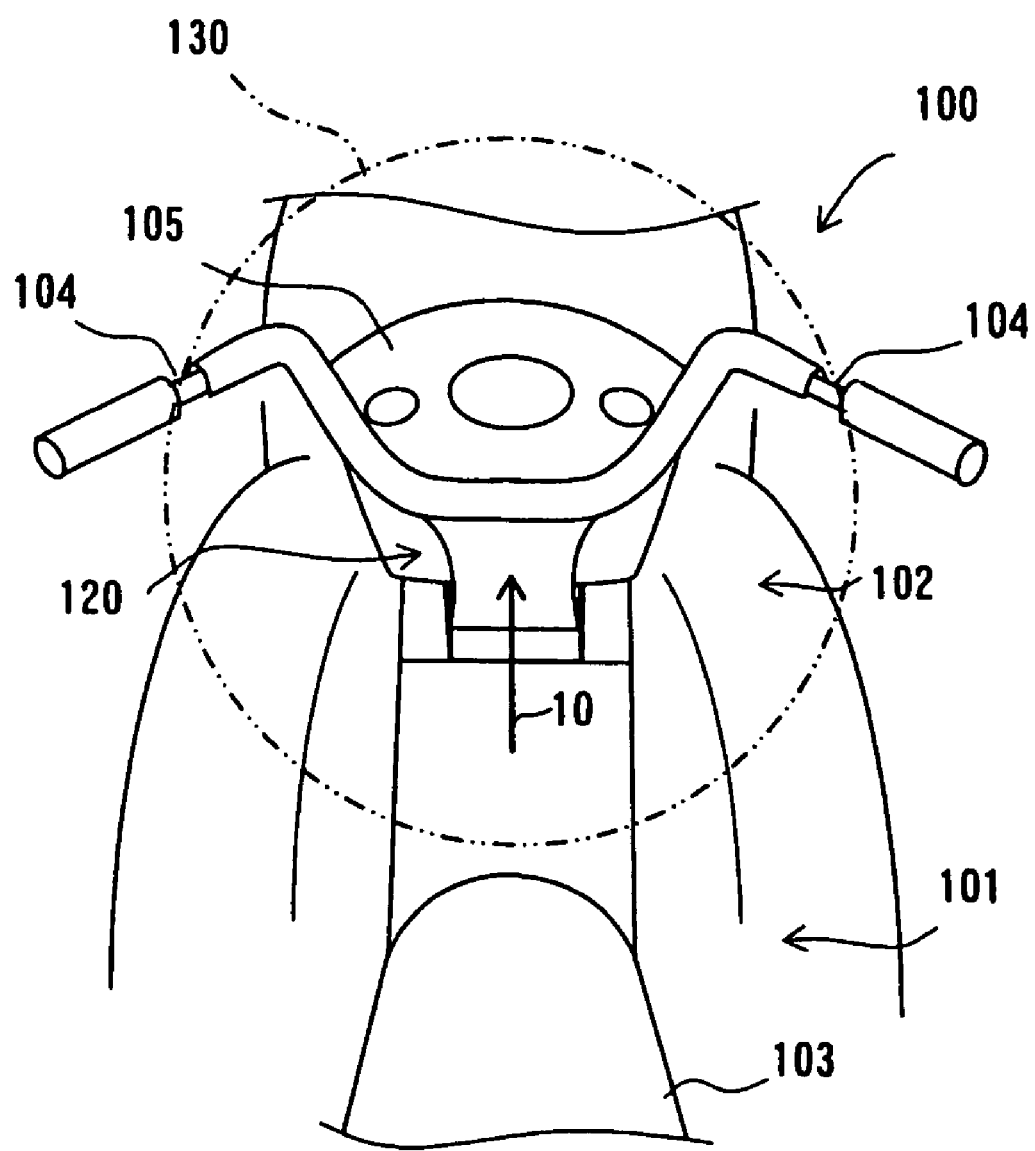
FIG. 1 shows a motor-bicycle 100 (scooter) of an embodiment of the present invention as seen from a rider, with an airbag device 120 being mounted to the motor-bicycle 100.
Figure 2:
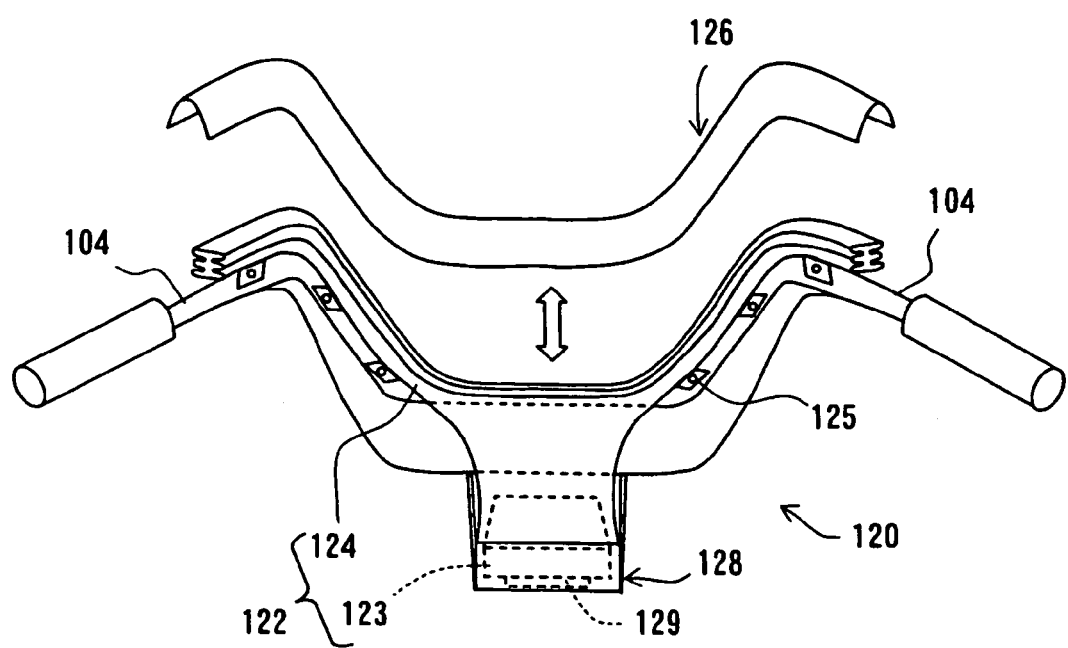
FIG. 2 illustrates the structure of the airbag device 120 shown in FIG. 1.
Figure 3:
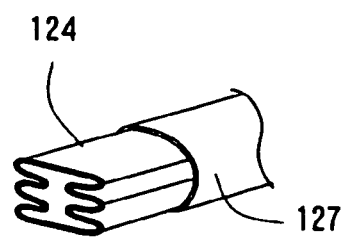
FIG. 3 is a partial enlarged view of FIG. 2.

Hereunder, a detailed description of an embodiment of the present invention will be given with reference to the drawings. FIG. 1 shows a motor-bicycle 100 (scooter) of an embodiment of the present invention as seen from a rider, with an airbag device 120 being mounted to the motor-bicycle 100. FIG. 2 illustrates the structure of the airbag device 120 shown in FIG. 1. FIG. 3 is a partial enlarged view of FIG. 2. The motor-bicycle 100 of the embodiment is one example of a motorcycle in the present invention.

As shown in FIG. 1, the motor-bicycle 100 is a scooter almost exclusively comprising, for example, a vehicle-body structural portion 101, a seat 103, a handlebar 104, and a front wheel and a rear wheel (not shown). The vehicle-body structural portion 101 comprises, for example, an engine and a mainframe. The rider can sit astride the seat 103.

An area disposed above the vehicle-body structural portion 101 of the motor-bicycle 100 and in front of the rider is defined as a rider protection area 130 that is used to protect the rider when the motor-bicycle 100 collides at a location which is situated in front of the motor-bicycle 100. The phrase "the motor-bicycle 100 collides at a location which is situated in front of the motor-bicycle 100" in the embodiment is used to widely include any collision of the motor-bicycle 100 with an object (not shown for the sake of simplicity) disposed in front of the motor-bicycle 100. In addition, the term "rider protection area 130" in the embodiment is defined as a space which extends in a forward movement direction 10 of the rider and which is used to restrain and protect the rider that is in a state capable of being thrown off in the forward direction of the motor-bicycle 100 when kinetic energy that is generated when the motor-bicycle 100 collides at a location which is situated in front of the motor-bicycle 100 is acting to move the rider in the forward direction of the motor-bicycle 100.

The handlebar 104, the airbag device 120, and a panel 105 having various types of meters, switches, etc., are disposed at a front portion 102 of the vehicle body among the portions of the vehicle-body structural portion 101. In particular, the airbag device 120 is mounted to the handlebar 104, and faces the rider protection area 130. In other words, the airbag device 120 of the embodiment is disposed so that a protruding (deployment and inflation) direction of an airbag 122 (described later) is in the forward direction of the rider.

As shown in FIG. 2, the airbag device 120 almost exclusively comprises, for example, the airbag 122, a retainer 128 for accommodating the airbag 122, an inflator 129 for supplying inflation gas for deploying and inflating the airbag 122 from the retainer 128, body mounting members 125, and a cover member 126. The retainer 128 corresponds to the "accommodating member" in the present invention.

The airbag 122 in the embodiment comprises a first structural portion 123 that is accommodated in the retainer 128 and a second structural portion 124 disposed outside the retainer 128. The first structural portion 123 is, for example, folded in a roll, and is accommodated in the retainer 128.

Here, there are various modes of disposing and mounting the second structural portion 124 outside the retainer 128. In the embodiment, first to third embodiments having different modes of disposing and mounting the second structural portion 124 will be described.

In the first embodiment, the second structural portion 124 of the airbag 122 is mounted outside the retainer 128 in a longitudinal direction of the handlebar 104 that is long by, for example, the mounting members 125. In the embodiment, the second structural portion 124 of the airbag 122 is disposed outside the retainer 128, and is such as to be mounted to the handlebar 104, which is a member at the body of the motorcycle. In other words, the second structural portion 124 mounted to the handlebar 104 corresponds to the "portion of the airbag disposed outside the accommodating member," and the handlebar 104 corresponds to the "member at the body of the motorcycle" and the "handlebar section" in the present invention. The second structural portion 124 may be disposed by deploying (drawing out) a portion of the entire airbag 122 that is accommodated in and mounted to the retainer 128 from the retainer 128, or by mounting the airbag 122 by previously disposing a portion of the airbag outside the retainer 128.

The second structural portion 124 is mounted to the top surface of the handlebar 104 by the mounting members 125. As the mounting members 125, types of rivets, bolts, clips, etc., may be used as required. The cover member 126 has a form in correspondence with the form of the handlebar 104 to which the second structural portion 124 is mounted, and covers the second structural portion 124 so that the entire handlebar 104 is covered. The cover member 126 has a tear line 126a, and is formed so that deployment and inflation of the second structural portion 124 are allowed by tearing the cover member 126 along the tear line 126a during the deployment and inflation of the second structural portion 124. In other words, the cover member 126 protects the second structural portion 124 from the outside on the one hand, and allows the deployment and inflation of the second structural portion 124 on the other.

Here, as shown in FIG. 3, it is desirable that the second structural portion 124 mounted along the handlebar 104 be previously folded into a predetermined form, such as in the form of an accordion, and, then, be covered by a protective cloth 127. As the protective cloth 127, anything which can maintain a folded state of the second structural portion 124, and which allows the deployment and inflation of the second structural portion 124 that is being deployed and inflated may be used. For example, a material that is easily torn so as not to hinder the deployment and inflation of the second structural portion, such as a thin cloth, may be used for the protective cloth 127. Such a structure makes it possible to maintain the folded state of the second structural portion 124 and to smoothly deploy and inflate the second structural portion 124. The protective cloth 127 and the cover member 126 correspond to the "cover" in the present invention.

Figure 4:
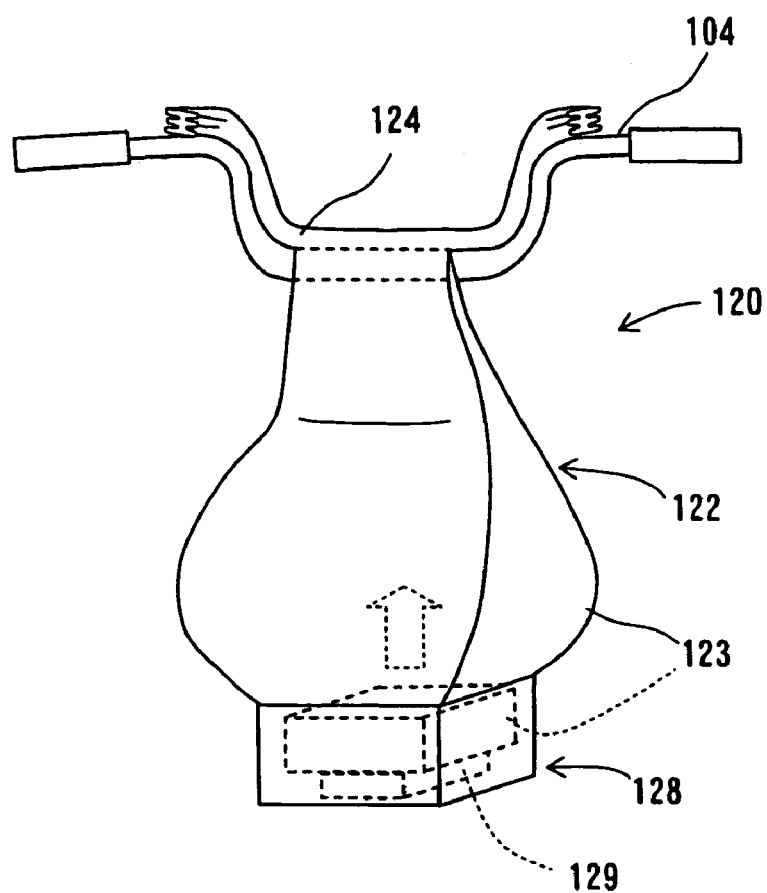
FIG. 4 is a schematic view showing an initial state of deployment of the airbag device 120.
Figure 5:
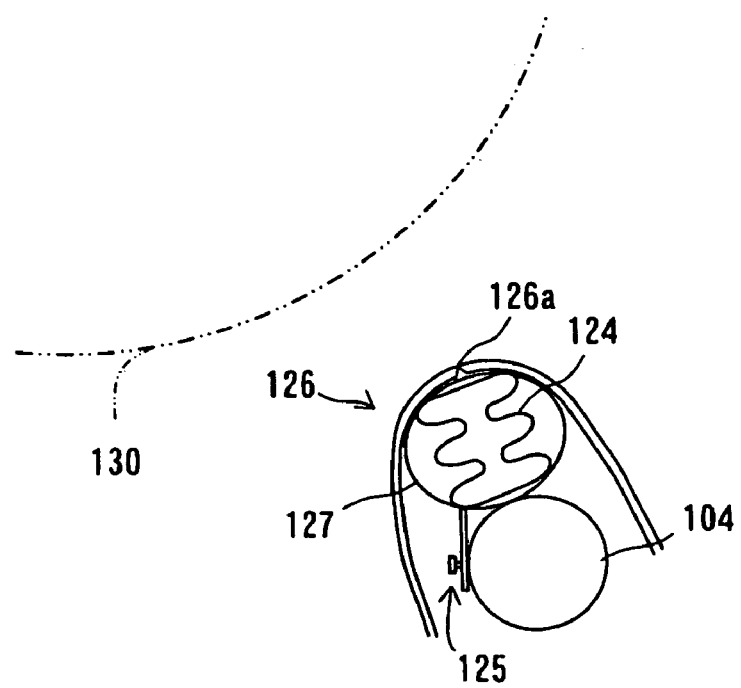
FIG. 5 is a partial sectional view of FIG. 4.
Figure 6:
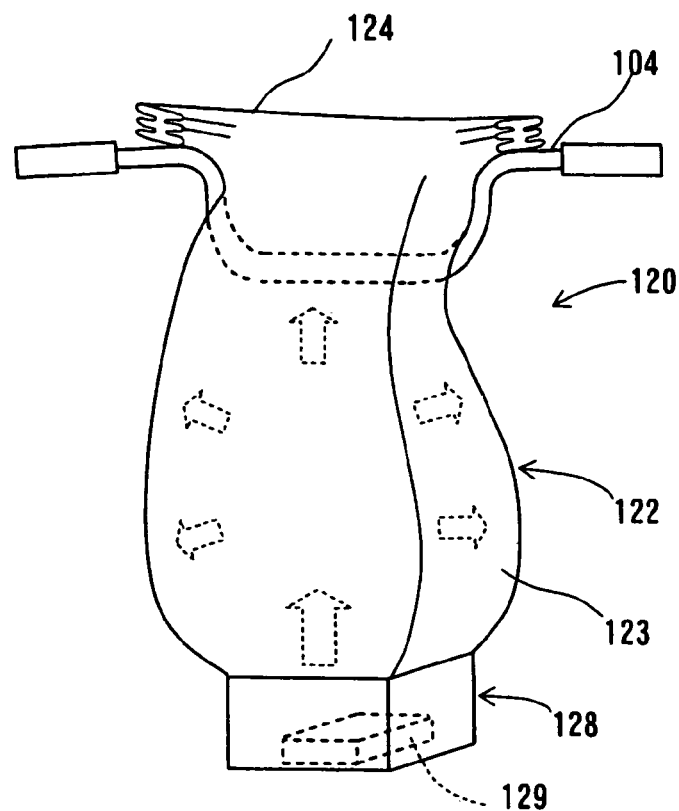
FIG. 6 is a schematic view showing a state in which the airbag device 120 is being deployed.
Figure 7:
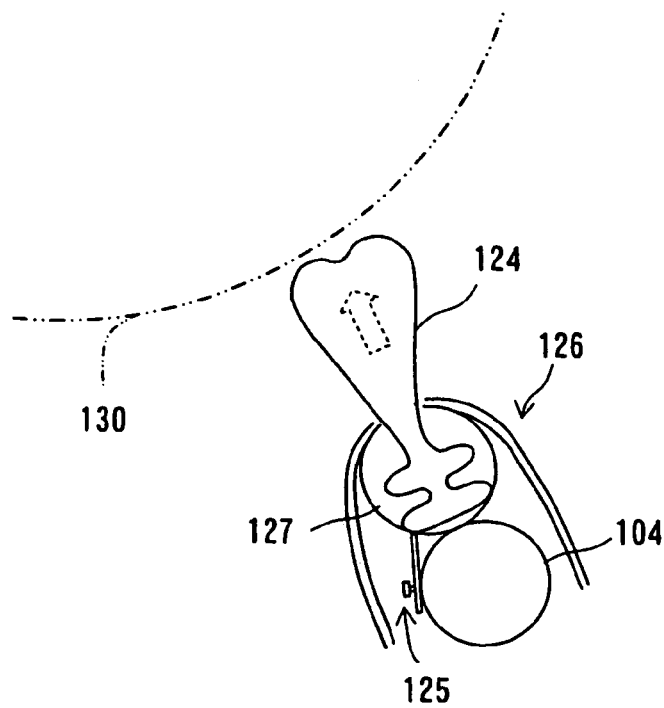
FIG. 7 is a partial sectional view of FIG. 6.
Figure 8:
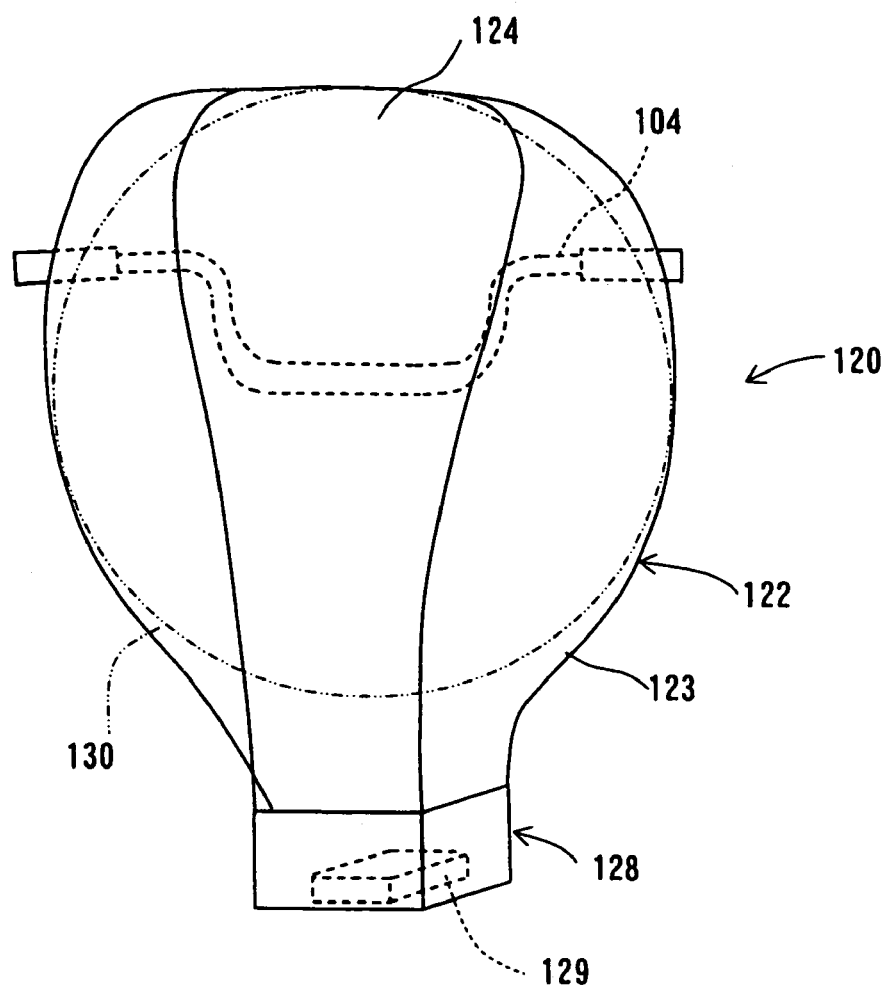
FIG. 8 is a schematic view showing a state in which the deployment of the airbag device 120 is completed.

Next, the operation of the airbag device 120 and the motor-bicycle 100 of the embodiments having the above-described structures will be described with reference to, for example, FIGS. 4 to 8 in addition to FIGS. 1 to 3. FIG. 4 is a schematic view showing an initial state of deployment of the airbag device 120. FIG. 5 is a partial sectional view of FIG. 4. FIG. 6 is a schematic view showing a state in which the airbag device 120 is being deployed. FIG. 7 is a partial sectional view of FIG. 6. FIG. 8 is a schematic view showing a state in which the deployment of the airbag device 120 is completed.

When the motor-bicycle 100 that the rider is riding collides in a direction of travel in an accident, the rider is in a state capable of being moved (thrown off) in the forward direction of the motor-bicycle 100 (that is, the direction of arrow 10 in FIG. 1). In the embodiment, by detecting the collision of the motor-bicycle 100 at a location which is situated in front of the motor-bicycle 100, the airbag device 120 operates in order to start the protrusion (deployment) of the airbag 122 from the airbag device 120 in the direction of the rider protection area 130. The deployment and inflation of the airbag 122 are started by starting supply of inflation gas into the airbag 122 from the inflator 129 serving as inflation gas supplying mechanism. The initial state of deployment of the airbag device 120 is shown in, for example, FIGS. 4 and 5.

As shown in FIG. 4, in the initial state of deployment of the airbag device 120, the first structural portion 123 of the airbag 122 is deployed and inflated while forcibly coming out of the retainer 128. A mode in which the airbag 122 is inflated while being deployed corresponds to "deployed and inflated" in the present invention. In this state, as shown in, for example, FIG. 5, the second structural portion 124 disposed along the handlebar 104 is covered with the protective cloth 127 and is kept accommodated in the cover member 126.

The supply of the inflation gas into the airbag 122 is continued. The state in which the deployment and inflation of the airbag 122 have progressed is shown in, for example, FIGS. 6 and 7.

As shown in FIG. 6, during the deployment of the airbag device 120, the first structural portion 123 of the airbag 122 is further deployed and inflated so as to increase its inflated area on the one hand, and the deployment and inflation of the second structural portion 124 are started on the other. In this state, the second structural portion 124 mounted to the handlebar 104 is inflated as shown in, for example, FIG. 7. At this time, the protective cloth 127 and the cover member 126 are torn by expansivity of the second structural portion 124 in order for the structural portion 124 to protrude in the direction of the rider protection area 130.

When the airbag device 120 is completely deployed, as shown in, for example, FIG. 8, the entire airbag 122 comprising the first structural portion 123 and the second structural portion 124 is deployed and inflated in the rider protection area 130. In this state, the completely deployed and inflated airbag 122 fills the rider protection area 130 in order to, at the rider protection area 130, reliably hold and restrain the rider that is in a state capable of being moved in the forward direction of the vehicle body (that is, the direction of arrow 10 in FIG. 1) by kinetic energy that is produced in a collision, thereby preventing beforehand the rider from being thrown off in the forward direction of the motor-bicycle 100.

As described above, the airbag device 120 of the embodiment makes it possible to provide the airbag 122 which can be smoothly deployed and inflated without the airbag 122 getting caught by a protruding portion of, for example, the handlebar 104 by mounting the second structural portion 124 to the handlebar 104. In general, the handlebar of the motorcycle may be disposed at a location where the airbag that is being deployed and inflated easily gets caught by the handlebar. The mode of mounting the second structural portion 124 to the handlebar 104 itself in the embodiment is particularly effective in reducing the frequency with which the airbag 122 that is being deployed and inflated gets caught by the handlebar 104. Therefore, it is possible to thoroughly protect the rider in an accident.

The structure of the airbag device 120 of the embodiment makes it possible to, in particular, increase directivity regarding protrusion of the second structural portion 124 of the airbag 122, so that this structure is effective in controlling a protruding direction of the airbag 122. In other words, although it is necessary to think about, for example, in what form the airbag is to be folded so that it protrudes in a proper protruding direction in a related structure in which the entire airbag is accommodated in the accommodating member (retainer), it is possible to stably and reliably protrude the airbag 122 in the direction of the rider protection area 130 in the embodiment. It is more effective to, in particular, mount the second structural portion 124 over a wide range in a longitudinal direction of the long handlebar 104.

In the embodiment, by disposing the second structural portion 124 of the airbag 122 outside the retainer 128, it is possible to reduce the amount of time required to complete the deployment and inflation of the entire airbag 122, so that it is possible to enhance restrainability with respect to the rider. In addition, such a structure makes it possible to reduce the size of the retainer 128. Although an accommodating member that is disposed at, in particular, the body of a motorcycle having an open structure like the body of the motor-bicycle 100 is generally large because there is a demand for reliably restraining the rider by a larger airbag, the embodiment makes it possible to reduce the size of the retainer 128 serving as an accommodating member while enhancing the restrainability of the airbag 122 with respect to the rider. This is effective in improving the appearance of the motor-bicycle 100 having the airbag device 120 mounted thereto. In other words, the embodiment makes it possible to overcome the problem that an accommodating member that is disposed at, in particular, the body of a motorcycle having an open structure like the body of the motor-bicycle 100 is generally large because it is necessary to use a large airbag.

In the embodiment, since the second structural portion 124 is mounted to the handlebar 104 by the mounting members 125, the airbag 122 that is completely deployed and inflated is not easily displaced when restraining the rider, and the handlebar 104 that is rigid acts as a pressure section of the airbag 122, so that it is possible for the handlebar 104 to reliably receive a load that the rider exerts upon the airbag 122.

In the first embodiment, the second structural portion 124 of the airbag 122 is mounted outside the retainer 128 in a longitudinal direction of the handlebar 104. The way in which the second structural portion 124 is disposed at the handlebar 104 may be variously changed. For example, an airbag device 220 of the second embodiment shown in FIG. 9 may be used.

Figure 9:
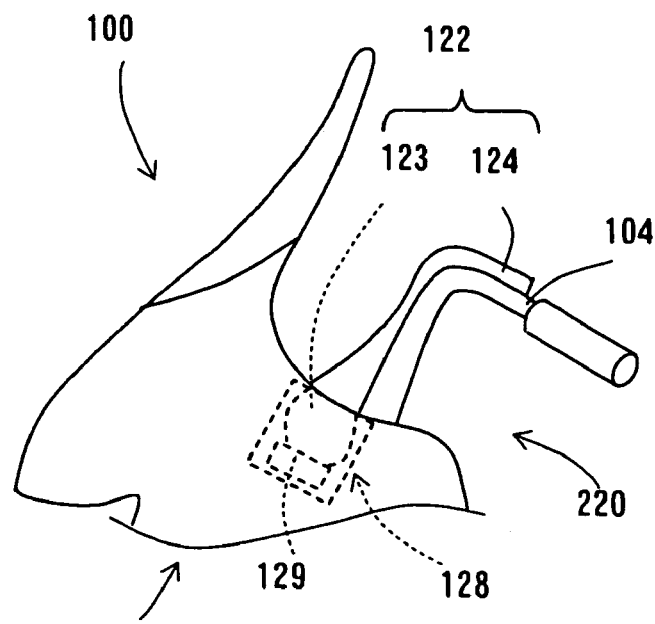
FIG. 9 is a side view of the structure of an airbag device 220 of another embodiment of the present invention.

In the airbag device 220 shown in FIG. 9, a second structural portion 124 of an airbag 122 is such as to be disposed and mounted to a portion of the handlebar 104 disposed towards the front of the vehicle body. When the second structural portion 124 is disposed in this manner, there are fewer obstacles that catch the airbag 122 that is being deployed and inflated, so that the airbag 122 is smoothly deployed and inflated. Parts shown in FIG. 9 that correspond to those shown in FIG. 2 are given the same reference numerals, and will not be described in detail below.

Although, in the first and second embodiments, the second structural portion 124 of the airbag 122 is disposed at and mounted to the handlebar 104, the second structural portion 124 may be mounted to a member at the body of the motorcycle other than the handlebar 104. For example, the second structural portion 124 may be mounted to the panel 105, which is one member at the body of the motorcycle, or near the panel 105.

Figure 10:
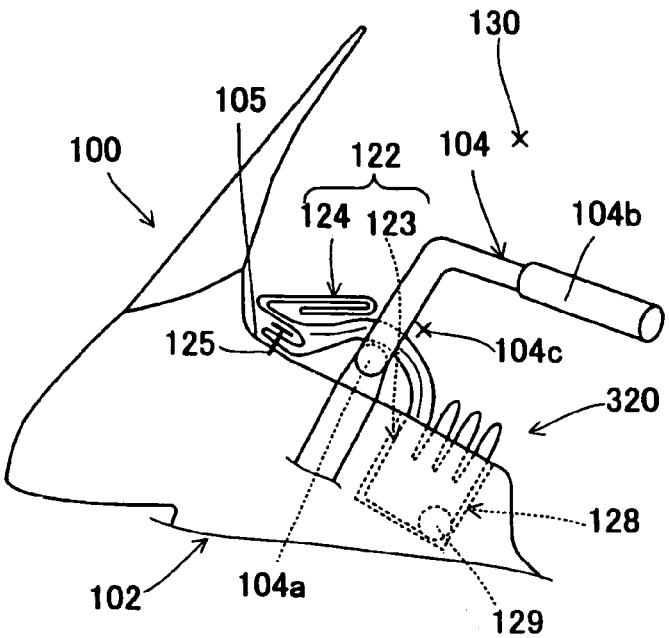
FIG. 10 is a side view of the structure of an airbag device 320 of one form of another embodiment of the present invention.
Figure 11:
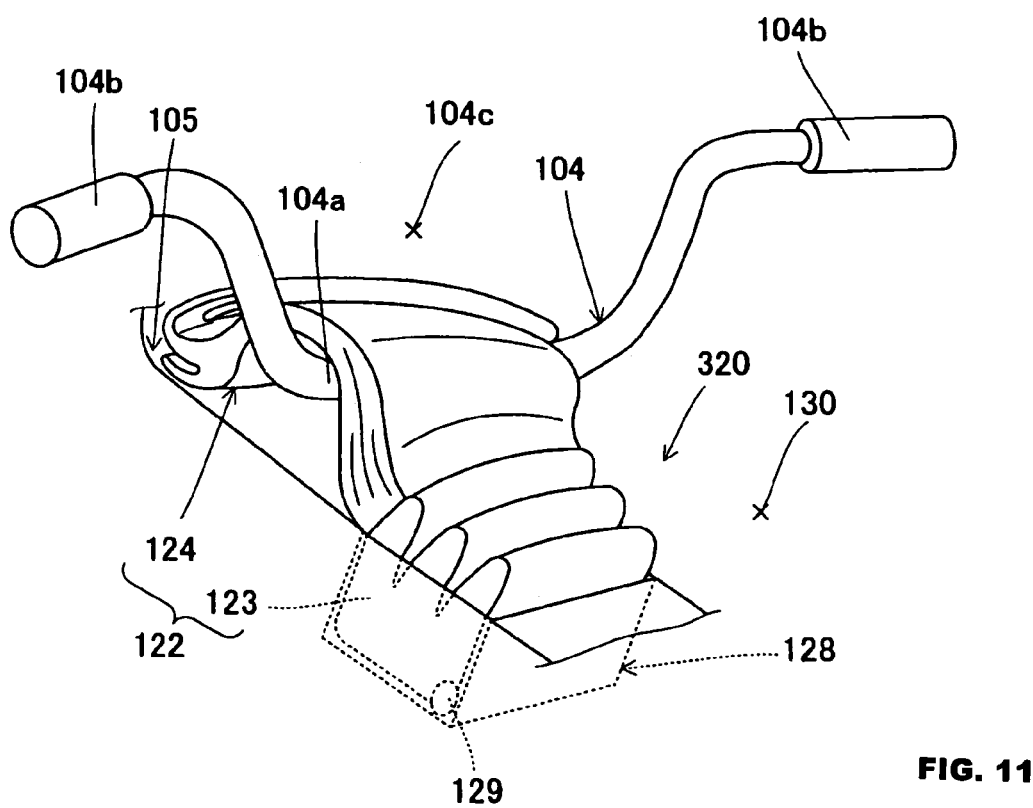
FIG. 11 is a perspective view of the structure of the airbag device 320 of the one form of the another embodiment of the present invention.
Figure 12:
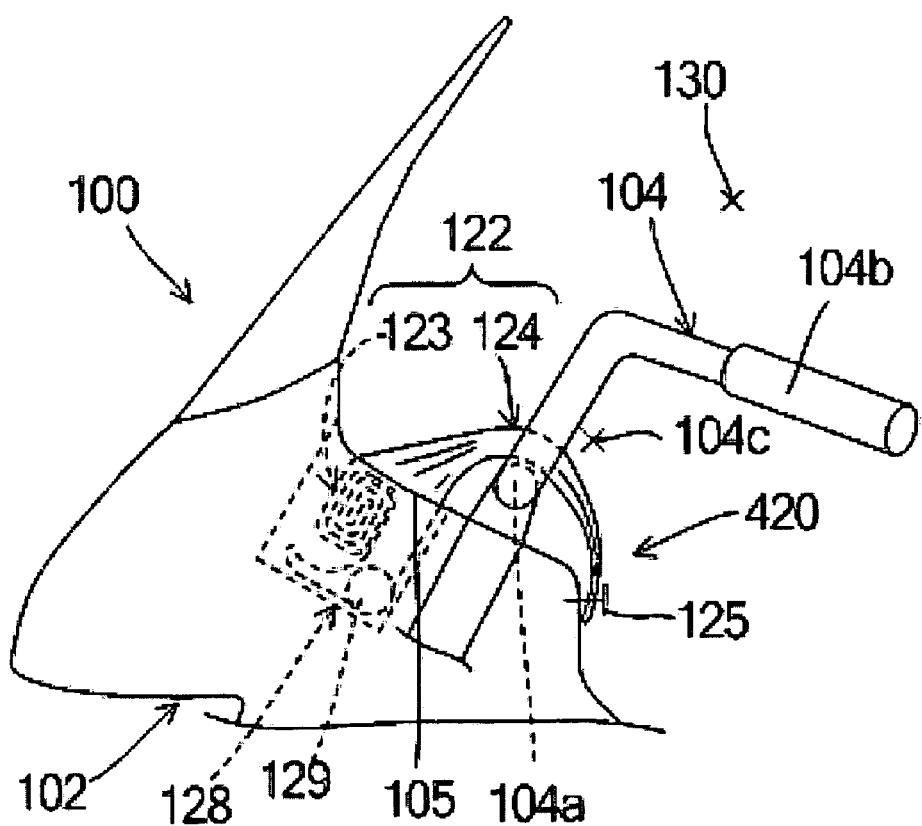
FIG. 12 is a side view of the structure of an airbag device 420 of another form of the another embodiment of the present invention.

Here, the modes of mounting the second structural portion 124 of the airbag 122 to a member at the body of the motorcycle other than the handlebar 104 will be described with reference to FIGS. 10 to 12. FIGS. 10 and 11 show the structure of an airbag device 320, and FIG. 12 shows the structure of an airbag device 420. Parts shown in these figures that correspond to those shown in FIGS. 1 and 2 are given the same reference numerals, and will not be described in detail below.

In the airbag device 320 shown in FIGS. 10 and 11, a retainer 128 is disposed towards the rear of the body of the motorcycle with respect to the handlebar 104. A second structural portion 124 of an airbag 122 is disposed in a forward/backward direction astride a central portion 104a of the handlebar 104 extending towards the left and right. The central portion 104a is disposed near the body of the motorcycle, and is attached to the body of the motorcycle. Operating portions 104b operated by a rider protrude upwardly leftwards and upwardly rightwards from the central portion 104a, respectively. A recess space 104c is formed by the central portion 104a and the operating portions 104b. The second structural portion 124 of the airbag 122 that is disposed astride the central portion 104a is previously folded in a predetermined form and is disposed in the space 104c. The central portion 104a corresponds to the "central portion" in the present invention, and the operating portions 104b correspond to the "operating portions" in the present invention.

In the embodiment, the second structural portion 124 of the airbag 122 that has been drawn out of the retainer 128 is disposed astride the top side of the central portion 104a from the rear side to the front side of the vehicle body, and is mounted to the front portion of the panel 105, which is one member at the body of the motorcycle, by the mounting members 125, such as bolts, rivets, or clips. The second structural portion 124 of the airbag 122 may also be mounted to a cowl at the body of the motorcycle.

In the airbag device 420 shown in FIG. 12, a retainer 128 is disposed towards the front of the body of the motorcycle with respect to the handlebar 104. A second structural portion 124 of an airbag 122 is disposed in a forward/backward direction astride the central portion 104a of the handlebar 104 extending towards the left and right. The second structural portion 124 of the airbag 122 that is disposed astride the central portion 104a is previously folded in a predetermined form, and is disposed in the space 104c formed by the central portion 104a and the operating portions 104b.

In the embodiment, the second structural portion 124 of the airbag 122 that has been drawn out from the retainer 128 is disposed astride the top side of the central portion 104a from the front side to the rear side of the vehicle body, and is mounted to the rear portion of the panel 105 by the mounting members 125.

When the airbag device 320 or 420 is used, the same operational advantages as those of the airbag device 120 are provided. In particular, the frequency with which the airbag 122 that is being deployed and inflated gets caught by the handlebar 104 can be reduced. This is because the handlebar 104 is disposed opposite the rider protection area 130 with the second structural portion 124 of the airbag 122 being disposed between the handlebar 104 and the rider protection area 130. The mode of disposing the second structural portion 124 of the airbag 122 astride the central portion 104a is effective in reliably engaging the completely deployed and inflated airbag 122 with the handlebar 104. By this, the handlebar 104 reliably receives a load that the rider exerts upon the airbag 122. Therefore, by mounting the airbag device 320 or the airbag device 420 to the motor-bicycle 100, it is possible to thoroughly protect the rider in an accident.

The structures of the airbag devices 320 and 420 are improved structures because the space 104c that is formed by the central portion 104a and the operating portions 104b of the handlebar 104 is used as an area in which the airbag 122 is deployed and inflated.

In each of the airbag devices 320 and 420, the second structural portion 124 of the airbag 122 may be covered with members that are similar to the cover member 126 and the protective cloth 127 of the airbag device 120 as required. By virtue of such a structure, when a member that is similar to the cover member 126 is used, it is possible to protect the second structural portion 124 from the outside. In addition, when a member similar to the protective cloth 127 is used, it is possible to maintain the folded state of the second structural portion 124, and to make it possible to smoothly deploy and inflate the second structural portion 124.

The present invention is not limited to the above-described embodiments, so that various other applications and modifications are possible. For example, the following forms to which any of the above-described embodiments is applied are possible.

Although, in the embodiments, the second structural portion 124 is described as being covered with the protective cloth 127 and the cover member 126 which is disposed so as to cover the entire handlebar 104, the protective cloth 127 and the cover member 126 need not be used. Alternatively, a portion of the second structural portion 124 may be covered with the protective cloth 127 and the cover member 126. The cover member 126 and the protective cloth 127 may form one member.

Although, in the embodiments, the second structural portion 124 of the airbag 122 is described as previously being disposed outside the retainer 128, the entire airbag 122 including the second structural portion 124 and the first structural portion 123 may be previously disposed outside the retainer 128. In this case, it is possible to reduce the size of the retainer 128 to a size corresponding to the size of the inflator 129, so that the retainer 128 can be made even smaller.

A structure which is a suitable combination of at least two of the structures of the airbag devices 120, 220, 320, and 420 may be used. For example, although, in the airbag devices 320 and 420, the second structural portion 124 of the airbag 122 disposed outside the retainer 128 is mounted to the panel 105 so as to be astride the handlebar 104 in the forward/backward direction, the second structural portion 124 of the airbag 122 that is astride the handlebar 104 may be mounted to the handlebar 104 or to a member, such as a bracket, connected to the handlebar 104.

Although the embodiments are described with reference to the motor-bicycle 100 (scooter), the present invention may be applied to other types of motorcycles.

According to the present invention, a technology of constructing an airbag which thoroughly protects a rider on a motorcycle in an accident, and technologies related thereto are provided.

What is claimed is:

1. An airbag device comprising:
   an airbag for being deployed in a predetermined rider protection area of a vehicle;
   an inflator operable to inflate the airbag in the rider protection area;
   a retainer in which the inflator and a first portion of the airbag are contained;
   a second portion of the airbag disposed outside the retainer prior to airbag deployment; and a mount between the second airbag portion and vehicle for securing the second airbag portion to the vehicle.

2. The airbag device of claim 1 wherein the retainer has a size closer to that of the inflator due to the second airbag portion exposed therefrom.

3. The airbag device of claim 1 wherein the mount comprises fastening members which minimize airbag displacement when inflated and restraining a vehicle rider during accident conditions.

4. The airbag device of claim 3 wherein the fastening members are rivets, bolts or clips.

5. The airbag device of claim 1 wherein the airbag portion includes a cover therefor to protect the second airbag portion from the environment external of the retainer.

6. The airbag device of claim 5 wherein the second airbag portion is folded in a predetermined manner, and the cover includes a protective material which maintains the second airbag portion folded.

7. The airbag device of claim 1 in combination with the vehicle with the vehicle comprising a motorcycle having a handlebar to which the mount secures the second airbag portion.

8. The combination of claim 7 wherein the second airbag portion extends along the handlebars.

9. The airbag device of claim 1 in combination with the vehicle with the vehicle comprising a motorcycle having a handlebar forwardly of the rider protection area and body portions with the mount securing the second airbag portion to one of the body portions so that the second airbag portion spans the handlebar transversely thereto.

10. The combination of claim 9 wherein the retainer is rearwardly of the handlebar, and the second airbag portion extends forwardly over the handlebar.

11. The combination of claim 9 wherein the retainer is forwardly of the handlebar, and the second airbag portion extends rearwardly over the handlebar.

12. An airbag device for a motorcycle having a body and a handlebar, the motorcycle airbag device comprising:
an airbag for being deployed in a predetermined rider protection area rearwardly of the handlebar;
an inflator operable to inflate the airbag in the rider protection area;
a retainer for the inflator mounted to the motorcycle body; and
at least a portion of the airbag extending external of the retainer prior to airbag deployment and secured to at least one of the motorcycle body and handlebar separate from the mounting of the retainer to the motorcycle body so that displacement of the inflated airbag upon rider impact therewith is minimized.

13. The motorcycle airbag device of claim 12 wherein the handlebar has an elongate configuration, and the airbag portion is configured to extend lengthwise along the elongate handlebar.

14. The motorcycle airbag device of claim 13 including mounting members that secure the airbag portion to the handlebar.

15. The motorcycle airbag device of claim 12 wherein the airbag portion extends transverse to the handlebar.

16. The motorcycle airbag device of claim 15 including mounting members that secure the airbag portion to the motorcycle body.

17. The motorcycle airbag device of claim 15 wherein the retainer is disposed rearwardly of the handlebar, and the airbag portion extends forwardly over the handlebar.

18. The motorcycle airbag device of claim 15 wherein the retainer is disposed forwardly of the handlebar, and the airbag portion extends rearwardly over the handlebar.

19. The motorcycle airbag device of claim 15 wherein the motorcycle body includes an instrument panel adjacent the handlebar to which the airbag portion is secured.

20. The motorcycle airbag device of claim 12 wherein the handlebar has a central portion and opposite operating portions that extend upwardly and outwardly from the central portion to form a recessed space therebetween, and the airbag portion extends either transversely to the handlebar central portion or along the handlebar portions such that upon airbag deployment interference with the handlebar is substantially avoided for smooth airbag inflation.

21. The motorcycle airbag device of claim 12 wherein the airbag includes another portion disposed in the retainer with the inflator.

22. The motorcycle airbag device of claim 12 wherein the entire airbag is disposed outside the retainer.

* * * * *